United States Patent [19]

Beaty, Jr. et al.

[11] 4,015,732
[45] Apr. 5, 1977

[54] AUTOMATIC PALLETIZER METHOD AND APPARATUS

[76] Inventors: Thomas Beaty, Jr., 20180 Whipple Drive, Northville, Mich. 48167; Asib S. Samander, 25802 Jeanette, Roseville, Mich. 48066

[22] Filed: Dec. 12, 1975

[21] Appl. No.: 640,238

Related U.S. Application Data

[62] Division of Ser. No. 101,529, Dec. 28, 1970.

[52] U.S. Cl. .............................. 214/152; 214/6 P
[51] Int. Cl.² ...................................... B65G 57/24
[58] Field of Search ................. 214/6 P, 6 G, 152

[56] References Cited

UNITED STATES PATENTS

| | | | |
|---|---|---|---|
| 2,977,002 | 3/1961 | Asp ............................. | 214/6 P |
| 3,381,828 | 5/1968 | Sheehan ....................... | 214/6 P |
| 3,416,674 | 12/1968 | Gualandris et al. ............ | 214/6 DK |
| 3,921,825 | 11/1975 | Sheehan ....................... | 214/6 P |

Primary Examiner—L. J. Paperner
Attorney, Agent, or Firm—Irving M. Weiner; Pamela S. Austin

[57] ABSTRACT

An improved method and apparatus for automatically loading a pallet including placing an empty pallet into loading position, loading items onto the pallet in a preselected arrangement, and removing the loaded pallet. The apparatus includes a conveyor system for delivering items to the loading means; the loading means may move laterally, vertically and rotatably. The entire operation may be hydraulic, and may be controlled by a program, such as by the use of a program tape, or program cards, or by a conventional relay control panel.

1 Claim, 8 Drawing Figures

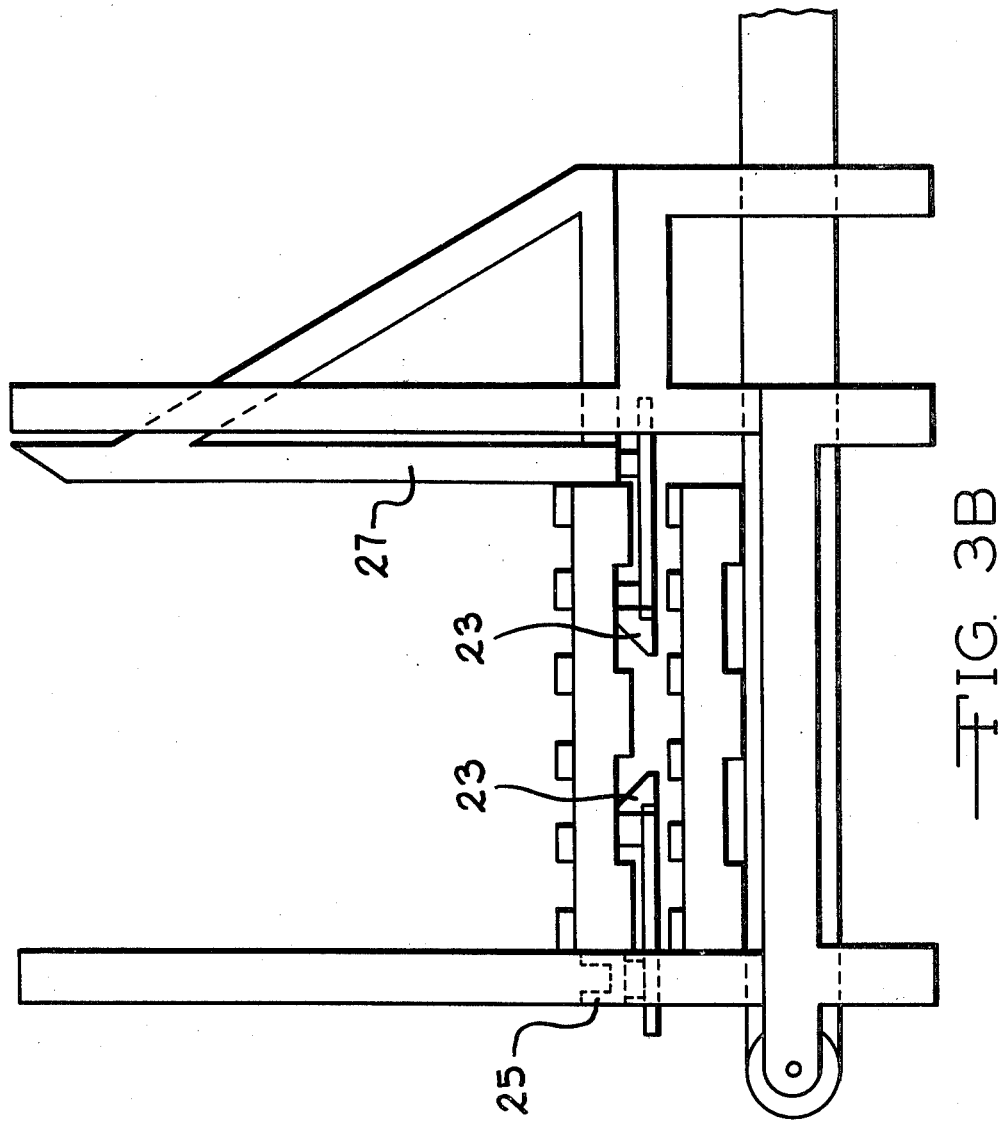

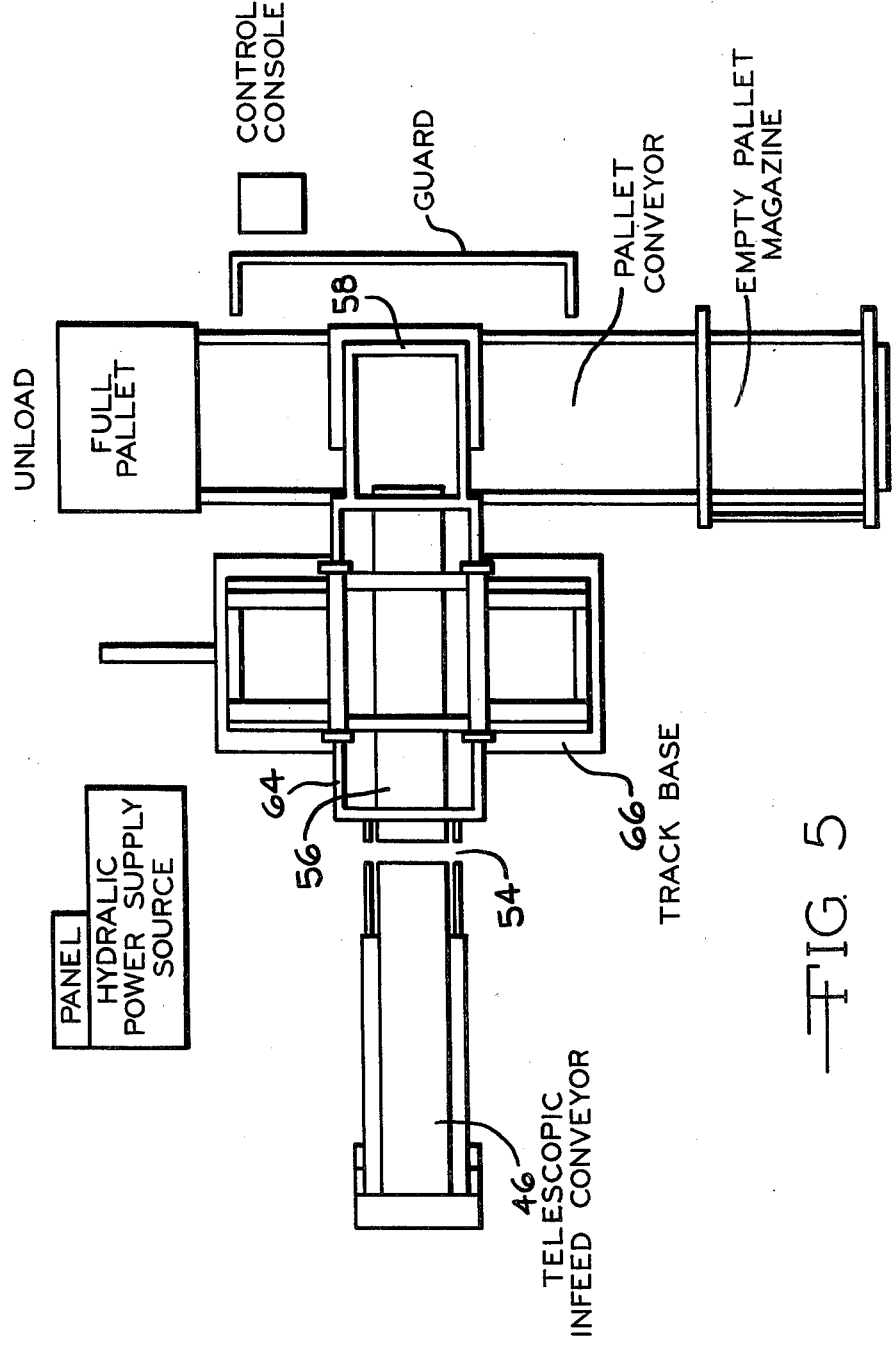

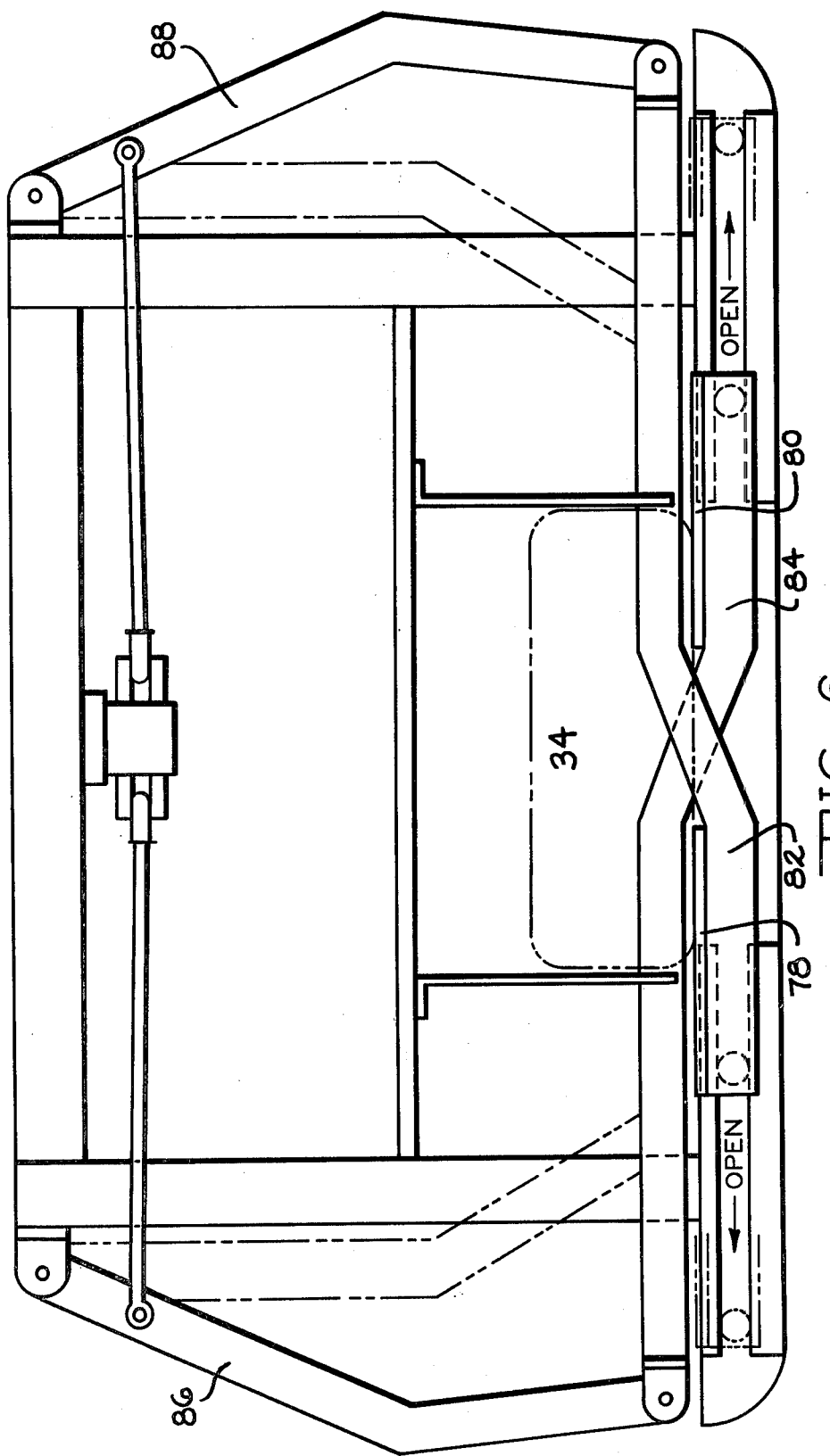

AUTOMATIC PALLETIZER METHOD AND APPARATUS

This is a division of application Ser. No. 101,529 filed Dec. 28, 1970.

BACKGROUND OF THE INVENTION

In the fields of package and material handling, expecially in the area of palletizing, the majority of the prior art devices operate in a fashion known as top loading. Top loaders utilize a forming platform level some ten to twelve feet above the floor level; thus, the items to be loaded, which are often one hundred pound bags, must be elevated to this platform level. In addition, walkways and stairways are usually necessary to gain access to the working parts of these machines.

In addition, some of these machines invariably include a vertically movable and/or rotatable pallet platform or turntable to raise the empty pallet from floor level to about ten to twelve feet above the floor (the platform level) and to rotate and lower the pallet to permit interlocked loading. The mechanism for accomplishing this motion is sometimes located in a pit below the floor level under the pallet and platform.

The problems which develop in gaining access to these machines are apparent from their size alone. Furthermore, if the vertical motion of the pallet and/or the rotation of the pallet are not within predetermined limits of the synchronization with regard to the release of items from the dispensing or loading portion of these machines, the pallets will not be loaded properly and usually the entire load on the pallet will have to be rearranged even though portions may have been loaded properly prior to the loss of the synchronization.

SUMMARY OF THE INVENTION

Accordingly, with the prior art problems in mind, the present invention provides a new and improved method and apparatus for loading a pallet.

It is an object of the present invention to provide a method and apparatus for loading a pallet which permits reasonably easy access to all working parts.

It is a further object of the invention to provide a method and apparatus for stacking or loading a pallet in a staggered or interlocked manner without moving the pallet.

It is yet another object of the present invention to provide a method and apparatus for loading a pallet utilizing hydraulic power exclusively.

It is still another object of the present invention to provide a pallet loading method and an apparatus which are automatically controlled, such as by a program tape or program cards.

These and other objects and advantages are accomplished in a new and improved automatic palletizer method and apparatus. The method includes loading items onto the pallet in interlocking form by vertically, laterally and rotatably moving the loading apparatus. The apparatus includes means for moving the loading apparatus vertically, means for moving the loading apparatus laterally, means for rotationally moving the loading apparatus, and means for releasing items from the loading apparatus.

The invention may also include conveyor means for feeding items into the loading apparatus, means for supplying empty pallets to the loading area, and means for removing fully loaded pallets from the loading area.

All the functions described may be performed hydraulically and may be performed automatically, such as under the control of a program tape or similar machine control devices.

BRIEF DESCRIPTION OF THE DRAWINGS

The above-mentioned advantages of the present invention, together with other features and advantages which may be attained by its use, will be readily apparent upon reading the detailed description of the invention in conjunction with the drawings. In the drawings, where like numerals identify corresponding parts:

FIG. 3B is a front elevational view of the apparatus shown in FIG. 3A;

FIG. 5 is a partial plan view of the palletizer of FIG. 4 and includes diagrammatically the empty pallet magazine and loaded pallet removal area; and FIG. 6 is an illustration of the stacking head of the present invention.

DETAILED DESCRIPTION OF A PREFERRED EMBODIMENT OF THE INVENTION

The principles of the present invention may best be understood by first considering the palletizing operation in general. When stacking items, which may be bags of a granulated or powdered product, or bales, or roofing shingles, or any of a variety of other products, it is generally preferred to stack in a fashion to permit interlocking of the items. In this way an excess of pressure or an uneven pressure will not topple the entire load of items on the pallet.

Figure 1:
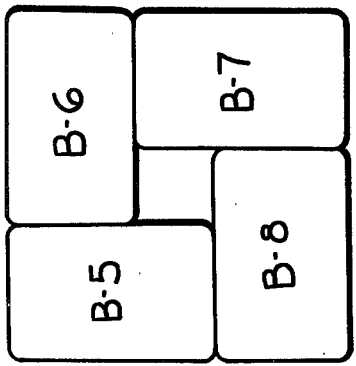
FIGS. 1 and 2 are top views of a partially loaded pallet illustrating alternate layers in an interlocking loading scheme.
Figure 2:
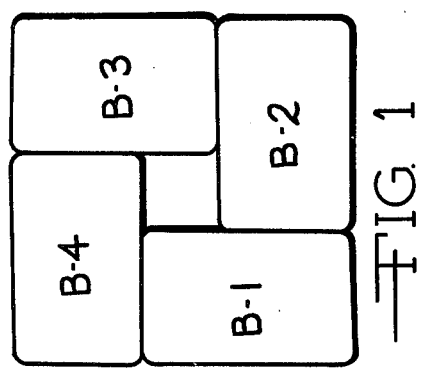

Referring first to FIGS. 1 and 2, the stacking is illustrated as applied, for example, to a four bag pinwheel pattern. It must be realized that this is by way of illustration only; various size pallets may be used and various shapes and numbers of items may be stacked on the pallet. According to the principles of this particular stacking pattern, the first bag B-1 may be placed in the lower left-hand corner of the pallet. Bag B2 is rotated 90° and placed in the lower right-hand corner of the pallet. Bag B-3 is then placed in the upper right-hand corner of the pallet generally parallel to bag B-1. Bag B-4 is rotated 90° and placed in the upper left-hand corner of the pallet generally parallel to bag B-2. The first layer is now completed.

FIG. 2 illustrates the second layer of bags. It is important to remember that the pallet has not been moved; thus, the layer illustrated in FIG. 2 is actually above the layer illustrated in FIG. 1. Bag B-5 is placed in the upper left-hand corner but parallel to bag B-1. Bag B-6 is rotated 90° and placed in the upper right-hand corner. Bag B-7 is parallel to B-5 but is in the lower right-hand corner, and bag B-8 is rotated 90° and placed in the lower left-hand corner. Thus, the second layer may be thought of as being one-half turn out of phase with the first layer. In this manner the layers "lock" as they are stacked. This is sometimes referred to as "lock-stacking the load." If all the layers were the same, for example, if all the layers were similar to FIG. 1, it may be appreciated that there would be four unrelated vertical stacks of bags on the pallet. Any bag loaded improperly on any one stack could cause that entire stack to topple.

Figure 3:
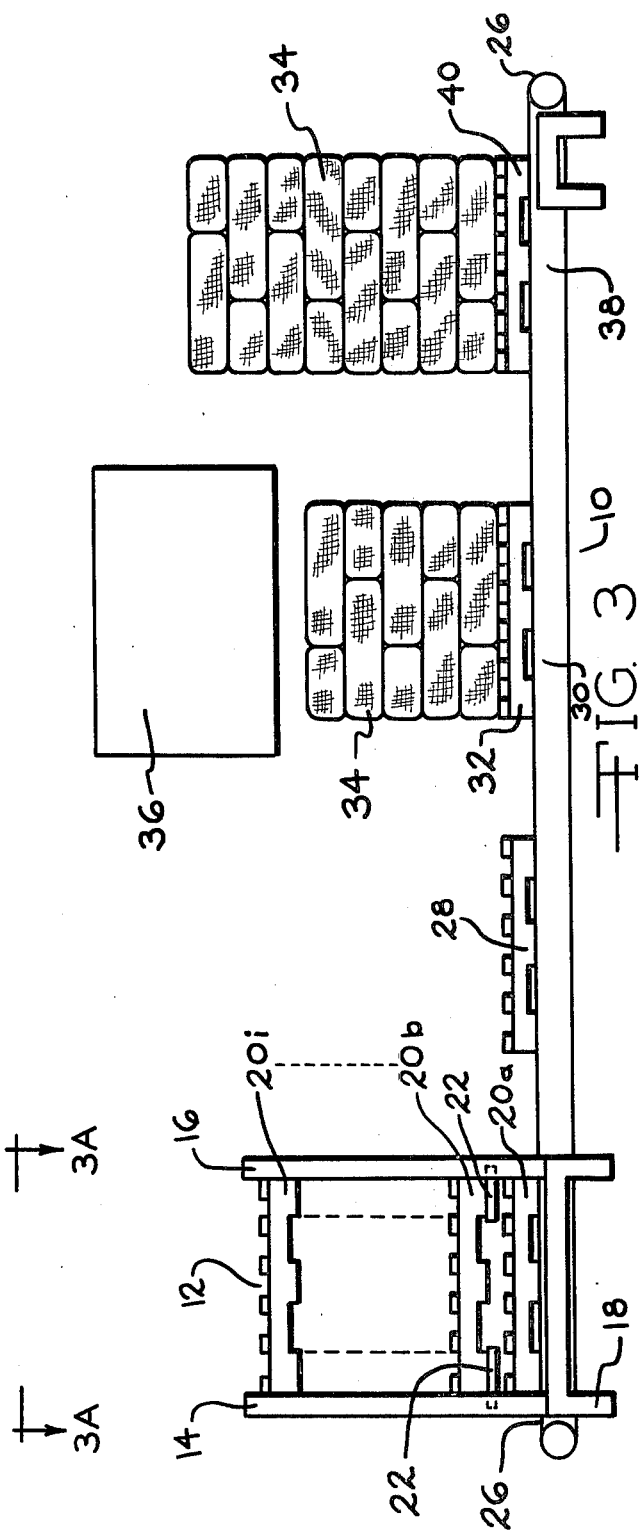
FIG. 3 is a partially diagrammatic front elevation view of an automatic palletizer embodying the principles of the present invention.
Figure 3A:
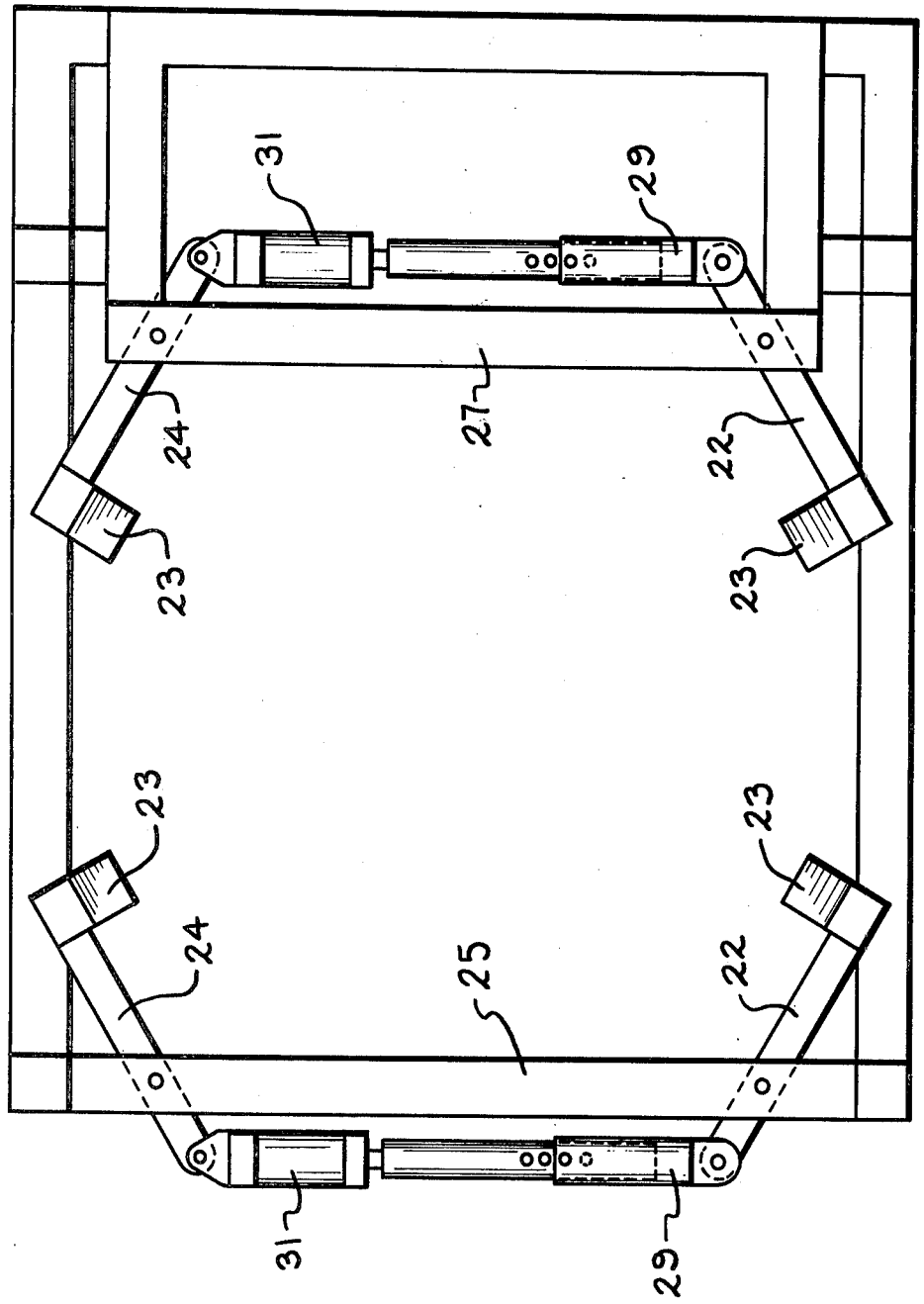
FIG. 3A is a top plan view taken along the line 3A—3A shown in FIG. 3.

Referring next to FIG. 3 the general operation of the automatic palletizer will be explained. FIG. 3 is a diagrammatic front elevation view of the automatic palletizer 10. The palletizer 10 may include an empty pallet magazine 12 which may include vertical support members 14 and 16 and a floor or lower support member 18. Illustrated in FIG. 3 are a plurality of empty pallets 20a . . . 20i and two front pivoted lifting arms 22. FIG. 3A also shows two back pivoted lifting arms 24 which are similar to the front pivoted lifting arms 22. A separate lifting wedge 23 is attached to each of the lifting arms 22 and 24. As viewed in FIG. 3A, the two left lifting arms 22 and 24 are pivoted to a horizontal adjustable frame support member 25 (see also FIG. 3B). The two right lifting arms 22 and 24 are pivoted to another horizontal adjustable support frame member 27.

Each lifting arm 22 is associated with and connected to a separate adjustable connector 29. The adjustable connector 29 is pinned to its associated lifting arm 22. Each back lifting arm 24 is associated with and pinned to a separate hydraulic cylinder 31. When the hydraulic cylinders 31 extend, all the pivoted lifting arms 22 and 24 rotate towards the center of the magazine. The lifting wedges 23 will engage the second pallet from the bottom, and lift vertically along the load of the empty pallets. The pallet on the bottom may then be dispensed by a conveyor 26 or by other suitable mechanical means. The hydraulic cylinders 31 are then retracted causing the pivoted lifting arms 22 and 24 to pivot outwardly relative to the center of the magazine in order to release the load of empty pallets. The lifting arms 22 and 24 may then be rotated toward the center of the magazine to engage the second pallet from the bottom when another pallet is needed. FIG. 3 also illustrates a pallet 28 which has been dispensed from the empty pallet magazine 12 just prior to entering the load area 30.

It should be noted that either one or both of the horizontal support members 25 and/or 27 may be made adjustable to move toward the right of left as depicted in FIG. 3A in order to adjust the spacing therebetween.

The loading or stacking area 30, as the designation implies, is that area where items such as bags are loaded onto the pallet according to the novel method and apparatus of the present invention. Loading area 30 is illustrated in FIG. 3 with a pallet 32 which has been loaded, for example, with five layers of bags 34. The alternate or interlocking placement of the bags, as explained herein above with reference to FIGS. 1 and 2 may also be seen in FIG. 3. The loading or stacking means 36 is depicted diagrammatically in FIG. 3 above the layers of bags 34 for the purpose of illustrating its relative position in the novel apparatus.

Figure 4:
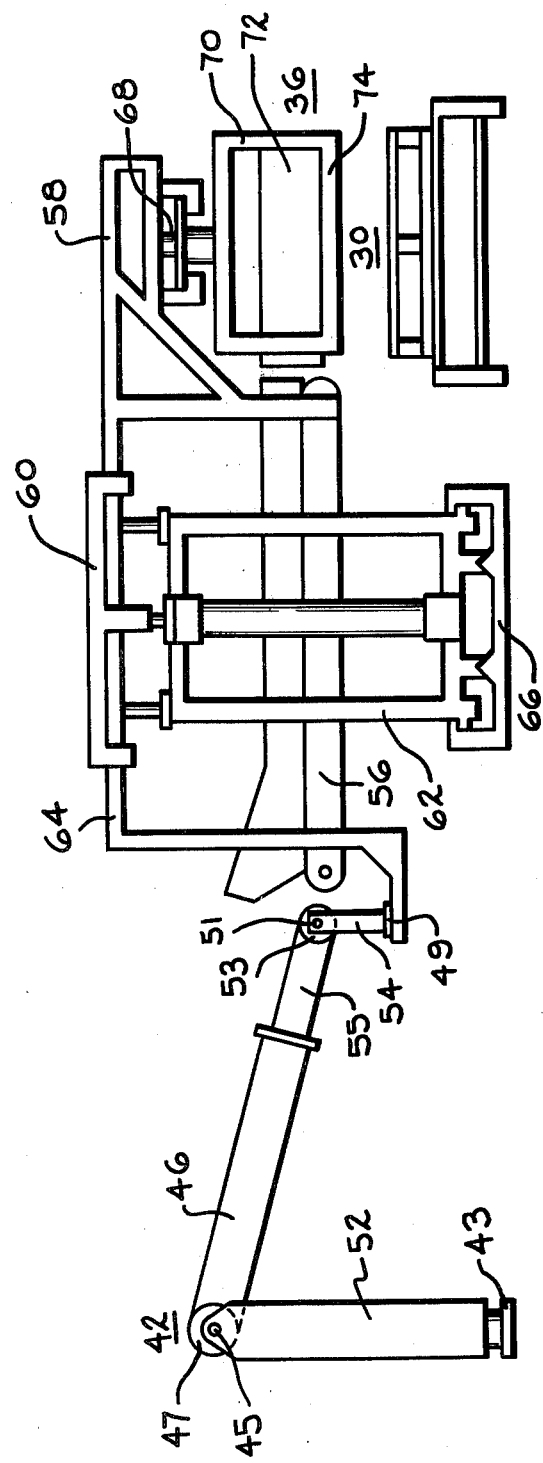
FIG. 4 is a side elevational view of an automatic palletizer embodying the principles of the present invention.

The details of the stacking means 36 are shown in FIGS. 4 and 5.

On the opposite side of the loading area 30 from the empty pallet dispensing means 12, there may be provided a pallet removal area 38. Conveyor 26 may be extended to carry the fully loaded pallet to the removal area 38, and another conveyor apparatus (not shown) may be used to remove a pallet 40, fully loaded with layers of bags 34, from the removal area 38 to a storage or shipping area.

It should be emphasized at this time that the empty pallet magazine 12 and the pallet removal via the conveyor 26 are not essential to the present invention; as a practical matter empty pallets may be placed into the loading area 30 by hand or by suitable mechanical means, such as a fork-lift truck, and may be removed when fully loaded by a fork lift.

Before explaining the conveying and loading system further, it must be realized that as the various layers are formed in the loading area the stack gets higher; thus, either the stacking means or loading means 36 must be elevated or the partially loaded pallet lowered. Since one problem with the prior art palletizers was the need for locating equipment in a pit below the loading area, the solution according to the principles of this invention is to provide loading means 36 which may be moved vertically as needed. In addition, elimination of equipment below the floor level precludes the use of a turntable or rotatable pallet platform. Thus, the loading means 36 should be capable of lateral movement to form the layers of bags 34 as explained with reference to FIGS. 1 and 2.

In most situations the packages or bags 34 that are to be palletized are usually carried by a conveyor from the last step in the manufacturing and packaging process. The conveyor conventionally terminates at a fixed place; thus, the conveyor means of the present invention must be able to deliver a package or bag 34 from a fixed point or area to the stacking or loading means 26 regardless of the position, vertical and/or lateral, of the loading or stacking means 36. The importance of this feature in the present invention can hardly be over emphasized; it would not be economical or feasable to require that the stacking means 36 return to the floor level before each bag 34 is loaded. Therefore, one feature of the present invention is the telescopic infeed conveyor means 46.

Referring to FIGS. 4 and 5, the telescopic infeed conveyor means 46 may increase or decrease in length, swivel to the left or right of center and rotate vertically in an arc while still providing a conveyor path from the fixed point where packages or bags 34 are initially received to the stacking means 36 above the stacking area 30.

The package at the receiving area 42 travels along the telescopic infeed conveyor 46 to the transport conveyor 56. The left or far end support frame 52 of the telescopic infeed conveyor 46 is mounted on a pivot bearing 43 fixed to the floor. Use center of this pivot bearing 43 is directly below the center of the extended shaft 45 which supports the tail pulley 47 of the outer section of the telescopic infeed conveyor 46. Shaft 45 serves two functions. It carries the tail pulley 47 of the telescopic infeed conveyor 46 and also serves as a pivot point (via two bearings attached to frame 52) through which the telescopic infeed conveyor 46 can rotate in a vertical plane. A yoke arrangement 54 is connected through a pivot bearing 49 to frame 64 which is a part of transport frame 58. Yoke 54 is attached to the extended shaft 51 of the head pulley 53 of the telescoping section 55 of the telescopic infeed conveyor 46 through the use of two flange bearings.

The transport conveyor 56 and the stacking means 36 are carried by the transport frame 58. Transport frame 58 may be supported by a hoist frame 60. A hydraulic cylinder (not shown) provides the force to move the transport frame 58 forward or reverse (into or out of the loading area 30 or left or right as illustrated in FIG. 4). A pair of hydraulic cylinders (not shown) are attached to the side transport frame 62 to move the hoist frame 60 vertically.

Thus, it may be appreciated that as hoist frame 60 is moved vertically upwards, frame 64, which is part of transport frame 58, lifts the near end of the conveyor path. The near end of the telescopic infeed conveyor 46 through pivot points 49 and 51, and the conveyor's telescoping or extending capability will follow the movement of the transport frame 58. Thus, packages 34 from the receiving point 42 will be delivered to the appropriate elevation. Similarly, because of the swivel points 43 and 45 and the telescoping or extending capability of the telescopic infeed conveyor 46, lateral movement of transport frame 58 (see FIG. 5) will not break the conveyor path from the receiving area 42 to the transport conveyor 56.

At this point it is appropriate to indicate that hydraulic cylinders and hydraulic piping have been omitted for clarity. It is quite well known that hydraulic apparatus may be used in a conventional manner to provide the several types of motion described.

Referring to FIG. 5, the partial plan view of the apparatus just described illustrates the track base 66 which permits lateral or side-to-side movement of the transport frame 58. Again, because of the structural support from frame 58 via frame 64 and pivot points 49 and 51 conveyor 46 pivots about its near and far ends at frame 52 and yoke 54, and the yoke 54 follows the transport frame 58. Thus, it may now be seen and appreciated that the conveyor system follows vertical, lateral, and-/or front and rear motion of the transport frame 58 to provide a conveyor path from the fixed area 42 to the loading means 36.

With reference to FIG. 4, the loading or stacking means 36 includes a swivel or pivot 68 suspended from transport frame 58, and a stacking head 70 mounted to the bottom portion of the swivel 68. The purpose of this swivel connection 68 is to permit the stacking head 70 to be hydraulically rotated 90° about a vertical axis. Rotation of the stacking head 70 in an arc of 90° clockwise or counter-clockwise to the longitudinal axis of the palletizer is an important feature of the invention. It is also within the ambit of the present invention to provide for 180°, 270°, and/or 360° rotation of the stacking head 70, if desired.

Considering FIGS. 1, 2 and 4 together, it will now be appreciated that front and rear motion of transport frame 58 within the hoist 60 permits packages to be stacked at the front and rear of a pallet; lateral movement along track base 66 permits packages to be stacked at the left and right sides of the pallet; the rotational movement of stacking head 70 which is swivel connected 68 to the transport frame 58 permits rotation of packages, and, of course, vertical movement of the hoist 60 within the side transport frame 62 permits stacking at each successive height or level on the pallet.

Referring again to FIG. 4, it is recalled that packages or bags 34 to be stacked are delivered along the conveyor paths 46 and 56. The package or bag 34 leaves conveyor 56 and its trajectory causes it to move into stacking head 70. Stacking head 70 includes an interior pocket 72 which has an escapement bottom 74.

Referring next to FIG. 6, the stacking head with the escapement bottom will now be described. In FIG. 6 the solid lines indicate the escapement in a closed position, and the dotted lines indicate the escapement in an open position. A package or bag 34 will rest upon escapement panels 78, 80, which are part of horizontal escapement members 82, 84 respectively. When the substantially vertical members 86 and 88 are hydraulically brought together, the horizontal escapement members 82 and 84 and the escapement panels 78 and 80 move horizontally apart. This provides an opening through which the package or bag 34 may drop into the pallet.

This completes the description of the various features of the palletizer according to the principles of the present invention. In light of the present-day technology it must be appreciated that it is desireable to fully automate this procedure. Many processes are computer controlled or controlled by a program tape or program cards. Basically, a punched tape or punched cards may be used along with a device to feed the cards or tape and sense the position of the various holes. The particular location of the punched holes may be electrically sensed to open or shut relays and thereby cause particular motors to be started or stopped or particular pumps to be started or stopped. The distance between various groups of holes indicate the time intervals during which the particular operation continues. Since tape controlled machines are quite well-known, it is believed that the above basic description of the principles of such a system will suffice to permit one with ordinary skill in the technology of tape controlled machinery to automate the palletizer of the present invention will not be illustrated or explained in detail since each aspect of motion and each step in the process has already been set forth as part of the explanation of the present invention.

We claim:
1. A method of stacking articles in successive interlocking layers upon a stationary pallet comprising the steps of:
 conveying articles to be stacked along a linearly extendable conveyor to a transport frame supported by a hoist frame, said transport frame having a loading head rotatably connected thereto;
 moving said transport frame along a first axis for selectively loading portions of said pallet;
 moving said transport frame along a second axis perpendicular to said first axis for selectively loading articles on portions of said pallet;
 rotating said loading head for stacking, in conjunction with each of said steps of moving, a first layer of articles on said pallet;
 raising said hoist frame for stacking successively higher layers on said pallet; and
 moving said extendable conveyor in response to movement of said transport frame supported by said hoist frame.

* * * * *